United States Patent [19]
Sipes

[11] 3,733,440
[45] May 15, 1973

[54] SEMIAUTOMATIC CALL PLACEMENT AND MESSAGE DELIVERY ARRANGEMENT

[75] Inventor: James David Sipes, Columbus, Ohio

[73] Assignee: Bell Telephone Laboratories, Incorporated, Murray Hill, Berkeley Heights, N.J.

[22] Filed: July 19, 1971

[21] Appl. No.: 163,743

[52] U.S. Cl. ................179/18 B, 179/18 AD, 179/88
[51] Int. Cl. ..............................................H04m 3/42
[58] Field of Search ....................179/2 TC, 5 P, 6 R, 179/6 C, 6 TA, 18 B, 18 BC, 18 BF, 18 BG, 84 R, 88, 18 AD

[56] References Cited

UNITED STATES PATENTS 3,510,591 5/1970 Klein ................................179/2 TC
3,504,130 3/1970 Gorgas et al. ...................179/18 BC

*Primary Examiner*—Thomas W. Brown
*Attorney*—R. J. Guenther et al.

[57] ABSTRACT

An arrangement is disclosed as an applique to a PBX to allow a PBX attendant to originate a series of message delivery calls. The attendant dials in PBX station numbers to which the message is to be delivered. These numbers are temporarily stored in a memory and sequentially outpulsed to the PBX in the order in which they were dialed by the attendant. The PBX then establishes a connection from the arrangement to a station identified by an outpulsed number. When the party at that station answers, a recorded message is connected to the established connection. After the message is delivered, the next station number in the memory is outpulsed to the PBX. Circuitry is provided to notify the PBX attendant when there is a failure to complete call if there is no answer or if the called station is busy.

16 Claims, 21 Drawing Figures

CODING OF DIGITS

| DECIMAL DIGIT | TWO OUT OF SEVEN CODE | | BINARY CODE | | | |
|---|---|---|---|---|---|---|
| | | | f0 | f1 | g0 | g1 |
| 1 | A | X | 1 | 1 | 1 | 1 |
| 2 | A | Y | 1 | 1 | 1 | 0 |
| 3 | A | Z | 1 | 1 | 0 | 1 |
| 4 | B | X | 1 | 0 | 1 | 1 |
| 5 | B | Y | 1 | 0 | 1 | 0 |
| 6 | B | Z | 1 | 0 | 0 | 1 |
| 7 | C | X | 0 | 1 | 1 | 1 |
| 8 | C | Y | 0 | 1 | 1 | 0 |
| 9 | C | Z | 0 | 1 | 0 | 1 |
| 0 | D | Y | 0 | 0 | 1 | 0 |

FIG. 14A
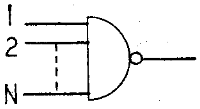
FIG. 14B
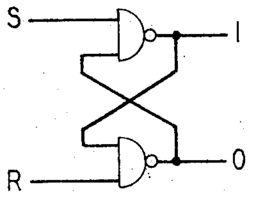
FIG. 14C
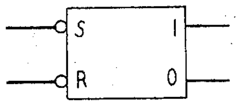
FIG. 14D
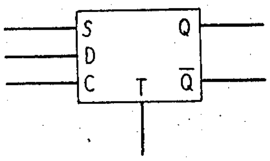
FIG. 14E
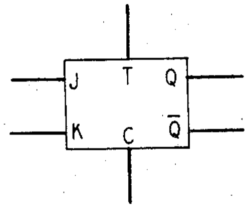
FIG. 14F
| INPUT | OUTPUT | |
|---|---|---|
| D | Q | $\overline{Q}$ |
| 0 | 0 | 1 |
| 1 | 1 | 0 |
FIG. 14G
| J | K | Q |
|---|---|---|
| 0 | 0 | Q |
| 0 | 1 | 0 |
| 1 | 0 | 1 |
| 1 | 1 | $\overline{Q}$ |

SEMIAUTOMATIC CALL PLACEMENT AND MESSAGE DELIVERY ARRANGEMENT

BACKGROUND OF THE INVENTION

This invention relates to message delivery systems and, more particularly, to apparatus for delivering a prerecorded message to selected stations, at selected times, under the control of an attendant.

In large hotels and motels, a great deal of the PBX attendant's time each morning is spent placing calls to wake up guests. It may even be necessary in many of these establishments to hire extra attendants to come in each morning solely for the purpose of providing this service. Accordingly, there have been a variety of attempts to automate this wake-up service. Several of these attempts have resulted in arrangements requiring an attendant manually to preset the time at which a wake-up call is to be made to a particular extension in the hotel or motel. These arrangements must therefore include some sort of time indicating and matching apparatus. A problem with this approach is that, depending upon the sophistication of the apparatus the costs involved can render the provision of automatic wake-up service uneconomical. Another problem with these arrangements is that the PBX attendants are unable easily to originate a plurality of successive calls for accurate wake-up service.

It is therefore apparent that a need exists for an economical arrangement whereby the regular PBX attendant can easily and accurately originate all of the wake-up calls required by guests in large hotels and motels.

SUMMARY OF THE INVENTION

In accordance with principles illustrative of this invention, apparatus is advantageously provided, as an applique to an existing PBX, for enabling a PBX attendant to originate a plurality of message delivery calls by rapidly dialing the numbers of PBX extensions to which it is desired to deliver the message, at the time that it is desired to deliver the message. The applique contains an announcement machine with a prerecorded message. It also includes a memory for accepting the dialed numbers at a rapid rate and circuitry for sequentially transmitting these number to the PBX. The PBX sets up a connection from the applique to the extension corresponding to the transmitted number and the applique connects the announcement machine over the connection when the called party answers. The announcement machine delivers the message and after this message delivery the applique automatically releases the connection and transmits the next dialed number to the PBX. Circuitry is also included in the applique for notifying the attendant when there is a failure to complete a call either because the called extension is busy or there is no answer.

In accordance with an aspect of my invention, the system is controlled by a call sequencer which sequences through a succession of different states. However, while the control circuitry itself is performing the logical operations determined by the particular state of the call sequencer and the particular information in the circuitry, the input and output functions can be proceeding independently and simultaneously. Thus, in accordance with my invention, the attendant can be entering new numbers into the system for the establishment of wake-up calls to extensions of the PBX at the same time that the system is simultaneously establishing a connection to a different extension or transmitting the recorded message to that extension. Accordingly, the attendant can very quickly store into the system all of the extension numbers of the extensions to be called at any one time without waiting for the actual connection of any of those calls to the extensions; the only limitation of the number of calls which the attendant can store in rapid sequence in the system is the capacity of the memory utilized, which memory may be as large as is deemed appropriate for that size PBX.

Further in accordance with another aspect of my invention, any call which is not completed within a specified time causes a transfer of that particular extension's number to a trouble register, causes a display at the attendant's position of the number in the trouble register, and alters the operation of the call sequencer to go to that state of the sequence causing the system automatically to read out of the memory the next number to be called just as if the prior call had been successfully terminated.

If a second trouble condition occurs, the call sequencer is stopped. Upon recognition of this situation by the attendant, the trouble register is reset and the system continues as if a single trouble had occurred.

In this specific illustrative embodiment of my invention, the buffering of the extension numbers to be called is attained by a memory comprising a plurality of flip-flop shift registers arranged so that the stored or buffered extension numbers are automatically shifted to one end of the shift registers. Further, the system is arranged, by the use of an up/down counter, always to store a new extension number entered into the system by the attendant in the unused or vacant shift register position closest to this one end of the shift registers.

It is another aspect of my invention that the system is automatically advanced upon detection of the end of the recorded message. If the attendant is neither entering a new number into the memory nor erasing a number priorly stored in the memory, the detection of the end of the recorded message places the system in that state in the call sequence to read out the next number stored in the memory preparatory to the establishment of the next call to an extension for connection of the recorded message thereto.

DESCRIPTION OF THE DRAWING

The foregoing inventive contributions will be more readily understood upon a reading of the following description in conjunction with the drawing in which:

FIGS. 14A through 14E depict the logic elements utilized in the arrangement of FIGS. 2 through 12 and FIGS. 14F and 14G depict state tables for the elements of FIGS. 14D and 14E, respectively.

GENERAL DESCRIPTION

The arrangements and operation of the various components in an illustrative embodiment of this invention will be described subsequently with reference to the detailed FIGS. 2 through 12. However, in order to first gain an overall understanding of the arrangement contemplated, a brief and general description will be given with reference to the block diagram in FIG. 1.

Figure 1:
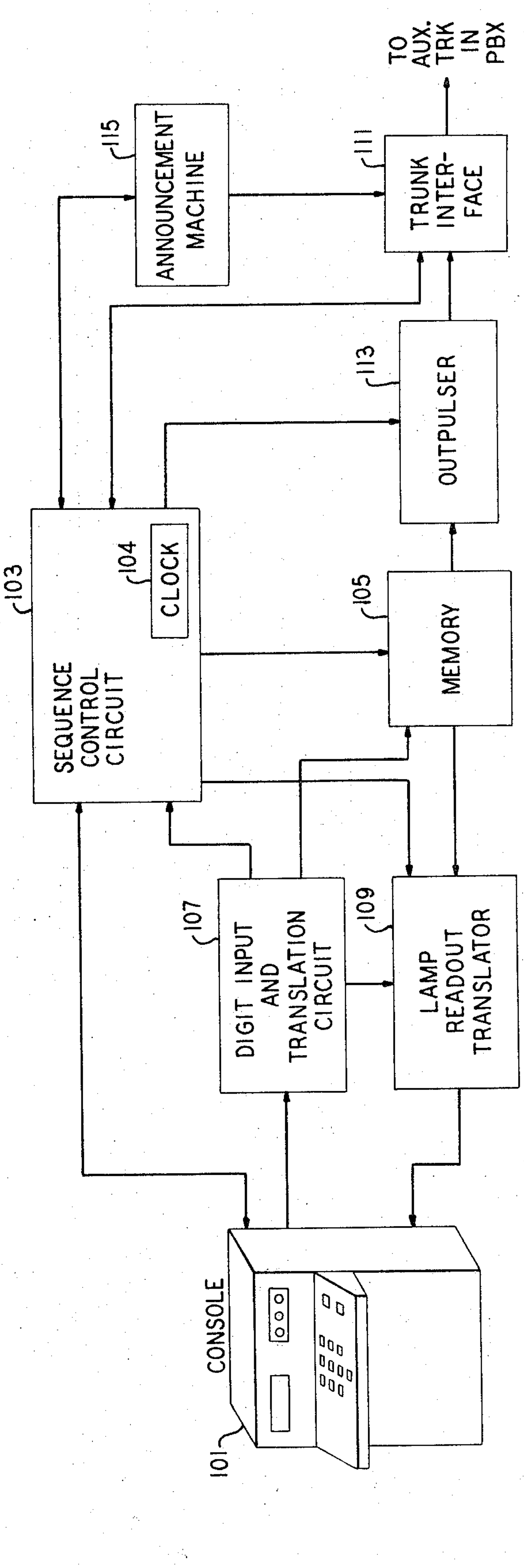
FIG. 1 depicts a block diagram of an illustrative embodiment of a system operating in accordance with the principles of this invention.

Turning now to FIG. 1, the reader will note that the illustrative arrangement depicted therein includes a console 101 through which an attendant may communicate with the message delivery system and also includes a trunk interface 111 connected to an auxiliary trunk of the PBX. This connection is the sole connection between the PBX and the illustrative message delivery system. Console 101 is provided with 12 keys, three indicator lamps and a digital lamp readout. The 12 keys are a START key, an ERASE key and 10 digit keys. The three lamps are a READY lamp, a SINGLE TROUBLE lamp and a DOUBLE TROUBLE lamp. The digital lamp readout is for displaying called numbers as they are entered into the console by the attendant and for returning called numbers to the attendant when trouble conditions are encountered.

To initiate a call, the attendant must first depress the START key. Sequence control circuit 103 is self-timed by clock 104 and responds to the signal generated by the depression of the START key to determine whether memory 105 has a vacant slot. Memory 105 is utilized to store called numbers entered into the console by the attendant until these numbers are utilized to set up connections in the PBX. When sequence control circuit 103 determines that memory 105 has a vacant slot, it causes the READY lamp on console 101 to be lit. At this time, the attendant depresses the proper digit keys on console 101 to enter the called number into the system via digit input and translation circuit 107. Lamp readout translator 109 then causes this number to be displayed on the digital lamp readout of console 101. At the same time, the called number is stored in a vacant slot of memory 105. At this time, the READY lamp is extinguished. If the attendant wishes to enter another number, she again depresses the START key and the above sequence is repeated. If there is no vacant slot in memory 105, the READY lamp will not be lit. However, the START request is remembered by sequence control circuit 103 and when a memory slot is available the READY lamp will be lit. If the attendant depresses the ERASE key, the last-filled slot in memory 105 will be cleared and the system will return to the state it was in immediately prior to the last operation of the START key.

Memory 105 is illustratively a set of shift registers. The number of registers in the memory is equal to the number of bits necessary to code a station number and the length of the registers is equal to the number of station numbers desired to be stored at any given time. This memory is arranged so that station numbers are read out of the right end of the registers and after each call is completed the contents of the registers are shifted one place to the right. Information is always written into the rightmost unused memory slot. In order to steer input information into the rightmost unused memory slot, an up/down counter which indicates the rightmost unused slot is utilized.

After a called number is stored in memory 105, sequence control circuit 103 causes trunk interface 111 to seize the auxiliary trunk in the PBX to which it is connected. Trunk interface 111 is arranged to recognize supervisory signals from the auxiliary trunk. When it is determined that the PBX is ready to accept a called number, sequence control circuit 103 causes the number in the rightmost memory slot of memory 105 to be gated into outpulser 113 which then outpulses the called number digits through trunk interface 111 to the PBX. The PBX then establishes a connection to the called station in the usual manner. When trunk interface 111 responds to an answer signal from the PBX, sequence control circuit 103 causes announcement machine 115 to deliver a prerecorded audio message to the called party. After the message delivery, sequence control circuit 103 causes trunk interface 111 to release the auxiliary trunk. The system is now ready to initiate another call if there is another called number in memory 105.

In the event that the called party does not answer within a predetermined time or the line is busy, sequence control circuit 103 is arranged to light the SINGLE TROUBLE lamp on console 101 and to cause lamp readout translator 109 to receive the called number from memory 105 and display this number on the digital lamp readout of console 101. Sequence control circuit 103 is further arranged to then attempt to call the next number stored in memory 105. The attendant may extinguish the SINGLE TROUBLE lamp and its corresponding display by depressing the START key. If another trouble is encountered before the attendant depresses the START key, sequence control circuit 103 lights the DOUBLE TROUBLE lamp on console 101 and stops all further action until the attendant depresses the START key. Upon the occurrence of this event, the DOUBLE TROUBLE lamp is extinguished, the SINGLE TROUBLE lamp is lit, and the called number which caused this second trouble is displayed on the digital lamp readout.

DETAILED DESCRIPTION

Before describing in detail the arrangement of FIGS. 2 through 12, it would be advantageous at this point to describe the logic elements utilized in the arrangement. FIG. 14A depicts the type of well-known logic gate utilized to perform all combinational logic functions. This gate performs the NAND function where the output is a low potential only when all of the inputs are high potential. If any input to the gate is low, the output of the gate is high.

FIG. 14B depicts an arrangement of gates of the type depicted in FIG. 14A which performs the function of a simple binary element, or flip-flop, which arrangement is symbolically depicted in FIG. 14C. In this arrangement, the leads designated 1 and 0 are logical complements of each other, i.e., when lead 1 is high, lead 0 is low, and vice versa. When a low signal is applied to lead S, lead 1 goes high and when a low signal is applied to lead R, lead 0 goes high.

The symbol depicted in FIG. 14D is that of a binary element known as a D-type flip-flop. Outputs Q and $\overline{Q}$ are logical complements. Output Q goes high when a low signal is applied to lead S and output $\overline{Q}$ goes high when a low signal is applied to lead C. Input lead D is a clocked input. Output Q assumes the state of lead D when a clock pulse is applied to lead T, as shown in the table of FIG. 14F. Thus, this binary element may very conveniently be utilized in a shift register arrangement by connecting the Q lead of one stage of the register to the D lead of the succeeding stage of the register. If this is done, a clock pulse applied to the T leads of all the elements in the register will shift the states stored in the elements to the succeeding stages.

FIG. 14E depicts the symbol of a binary element known as a J-K type flip-flop. Outputs Q and $\overline{Q}$ are logical complements of each other. When a low is applied to the C lead, this clears the flip-flop, putting a low on lead Q and a high on lead $\overline{Q}$. The table of FIG. 14G shows the output Q as a function of the inputs on leads J and K when a clock pulse is applied to lead T. Assuming a logical "1" to be a high signal and a logical "0" to be a low signal, it is seen from the table of FIG. 14G that if there are low signals on both the J and the K leads, then when a clock pulse is applied to lead T the state of output lead Q will remain the same. If the signals on leads J and K are different from each other, then when a clock pulse is applied to lead T output lead Q will assume the state on lead J. If high signals are applied to both leads J and K, then when a clock pulse is applied to lead T the output state of lead Q will be complemented. Thus, the J-K type flip-flop of FIG. 14E may be utilized as a toggle flip-flop if high signals are maintained on leads J and K.

Figure 12:
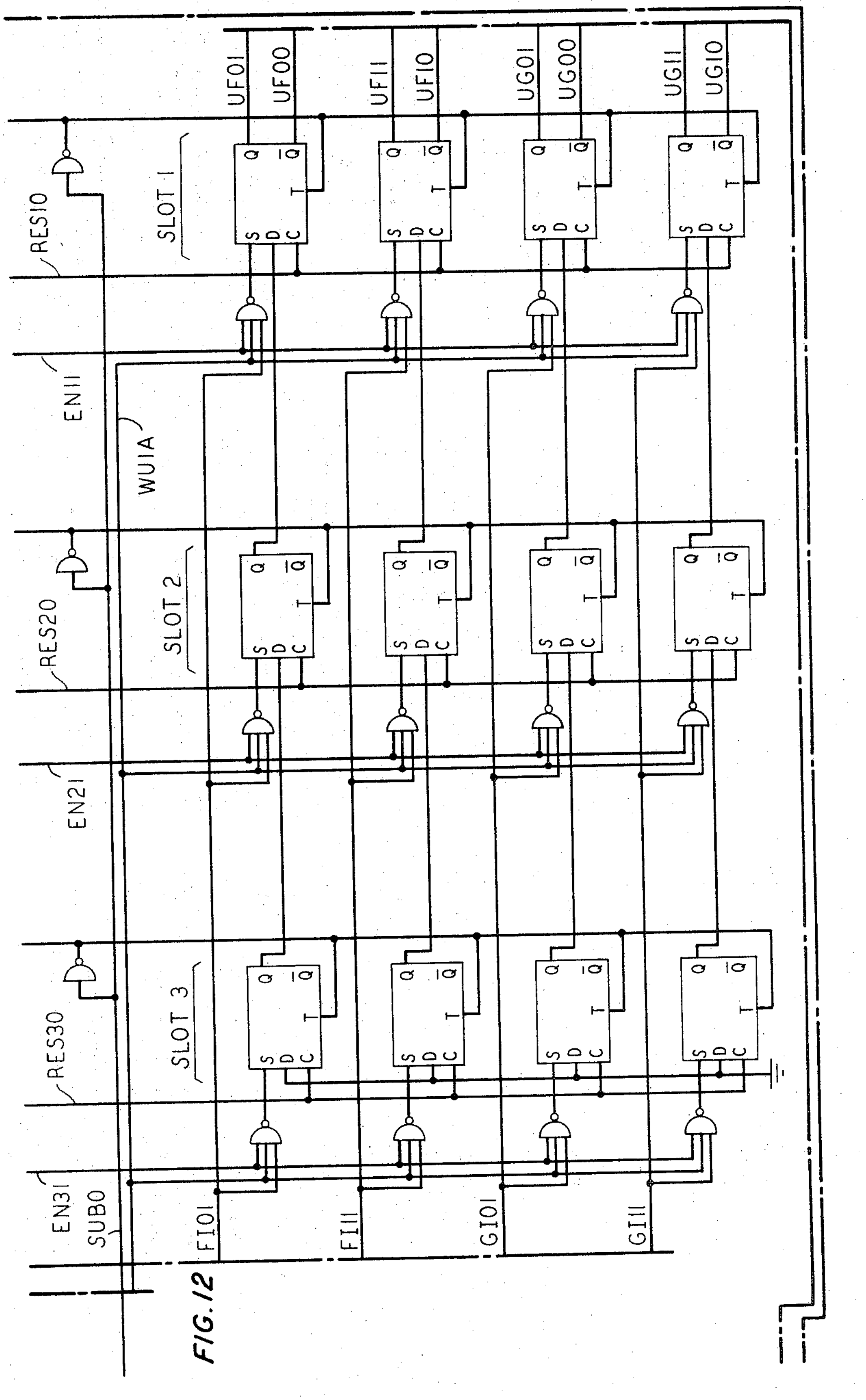
Figures 13, 15:
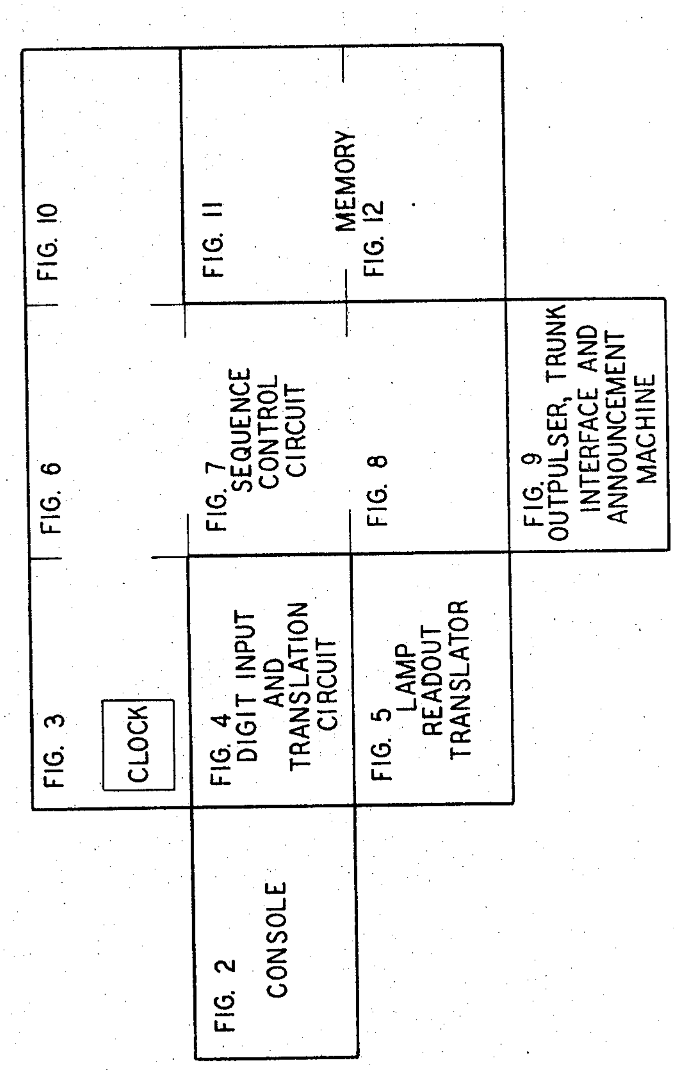
FIG. 15 depicts a coding of decimal digits dialed by the attendant.

FIG. 15 depicts a coding of decimal digits as utilized in this illustrative embodiment. When the attendant at the console depresses a digit key (FIG. 2), the decimal digit is encoded into a two-out-of-seven code. This code corresponds to the one-out-of-four rows and one-out-of-three columns which define the physical location of the particular digit key in the digit key array. The two-out-of-seven code is then encoded by the circuitry shown in FIG. 4 into the binary code as set forth in the table of FIG. 15. It is this binary code which is stored in the memory of FIGS. 11 and 12.

Figure 11:
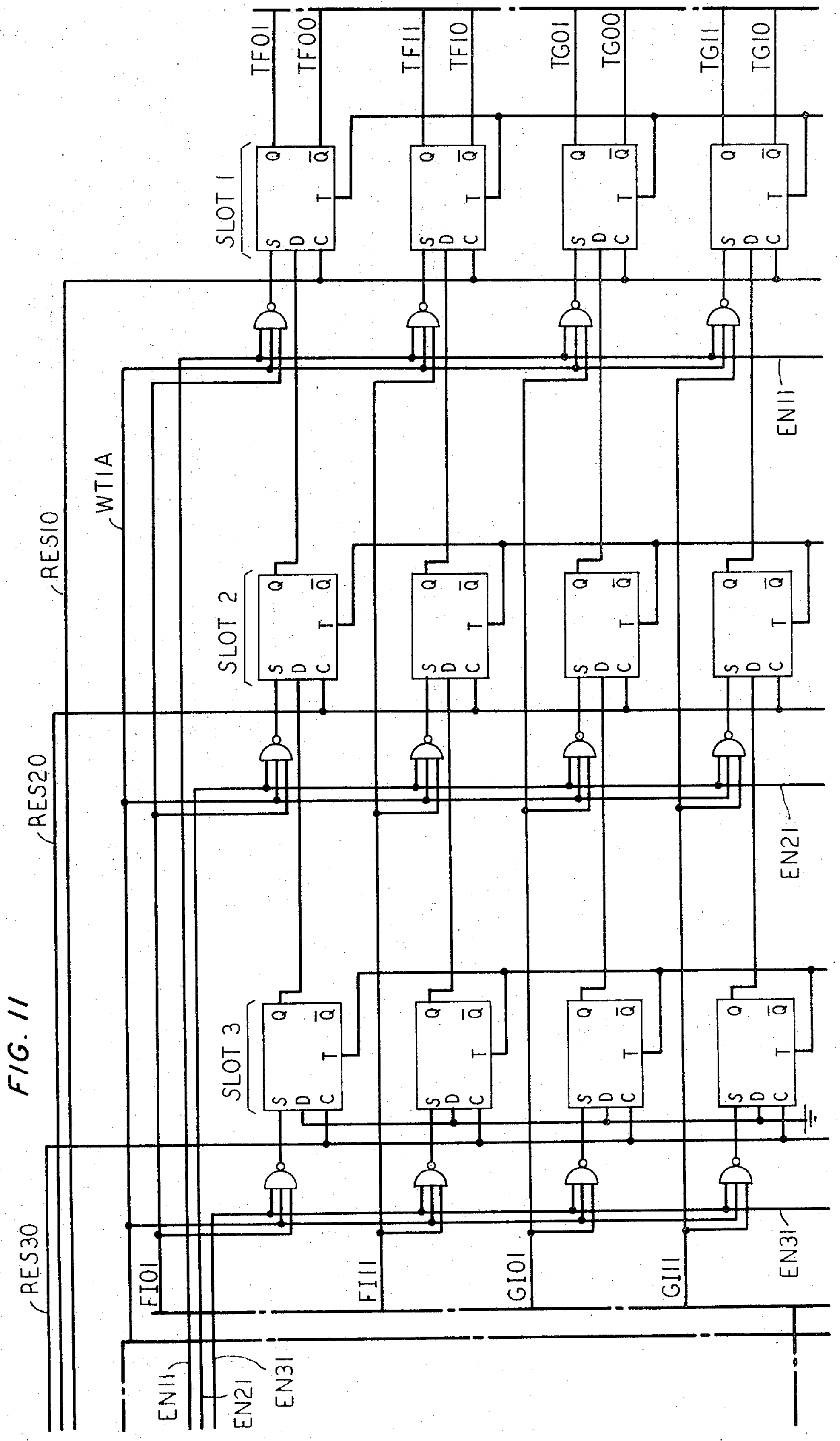

The memory detailed in FIGS. 11 and 12 is comprised of the D-type flip-flops of FIG. 14D along with appropriate steering logic. Each horizontal row of the memory is a shift register wherein data may be shifted from left to right. This is accomplished by connecting the Q lead of a flip-flop to the D lead of the next flip-flop to the right. Information may also be directly stored in a particular position of the registers without shifting by means of the S and C leads of the flip-flops making up that position.

Figure 7:
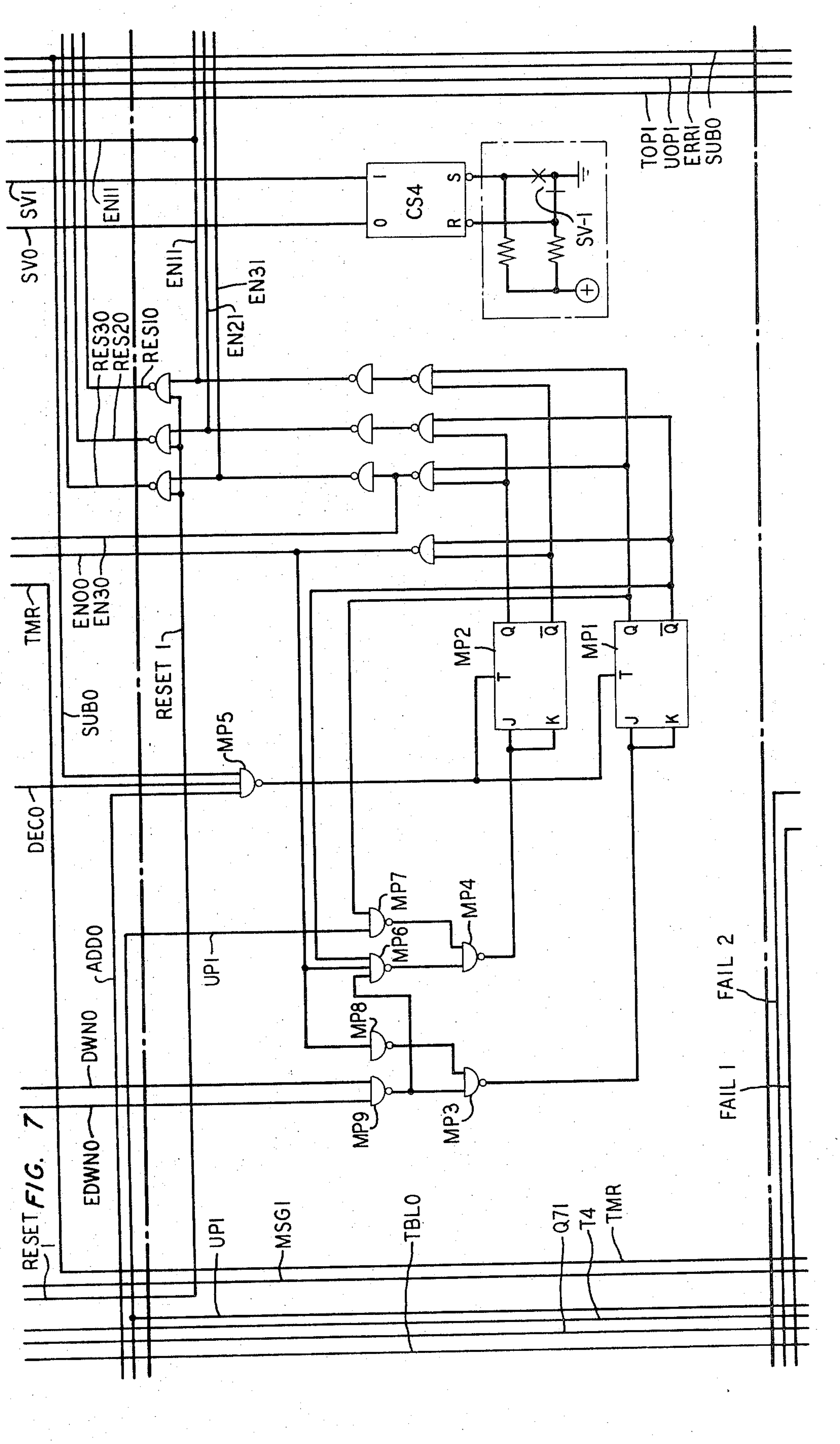

For the purpose of this illustrative embodiment, the memory is designed to store three two-digit numbers. The TENS digits of the numbers are stored in the portion of the memory shown in FIG. 11 and the UNITS digits of the numbers are stored in the memory portion shown in FIG. 12. In order properly to access the memory of FIGS. 11 and 12, a memory pointer is utilized. This memory pointer is an up/down counter made up of flip-flops MP1 and MP2 (FIG. 7). The memory may be considered to be divided into "slots," each "slot" being a vertical column of flip-flops in FIGS. 11 and 12, the storage of a called number requiring a single slot. The slots are numbered from right to left in FIGS. 11 and 12 as slot 1, slot 2 and slot 3. The states of flip-flops MP1 and MP2 indicate which of the slots are filled with called numbers at any given time. If lead EN11 (FIG. 7) is high, this indicates that only slot 1 is filled. If lead EN21 (FIG. 7) is high, this indicates that slots 1 and 2 are both filled. If lead EN31 (FIG. 7) is high, this indicates that all slots 1, 2 and 3 are filled. If none of the leads EN11, EN21, or EN31 are high, this is an indication that the entire memory is empty. The state of the memory pointer changes during the normal sequence of operations, as will subsequently be described in detail.

Figure 3:
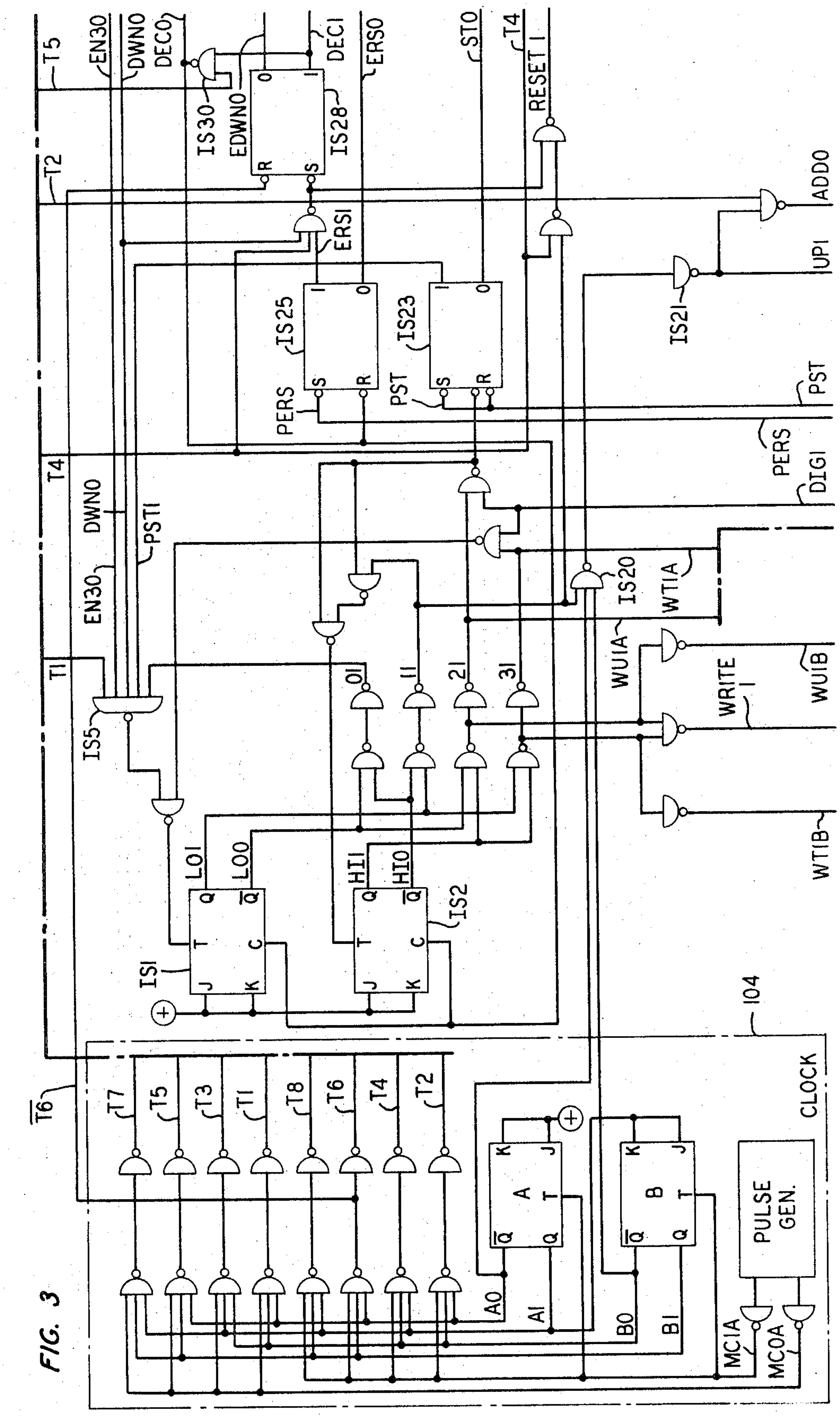
Figure 4:
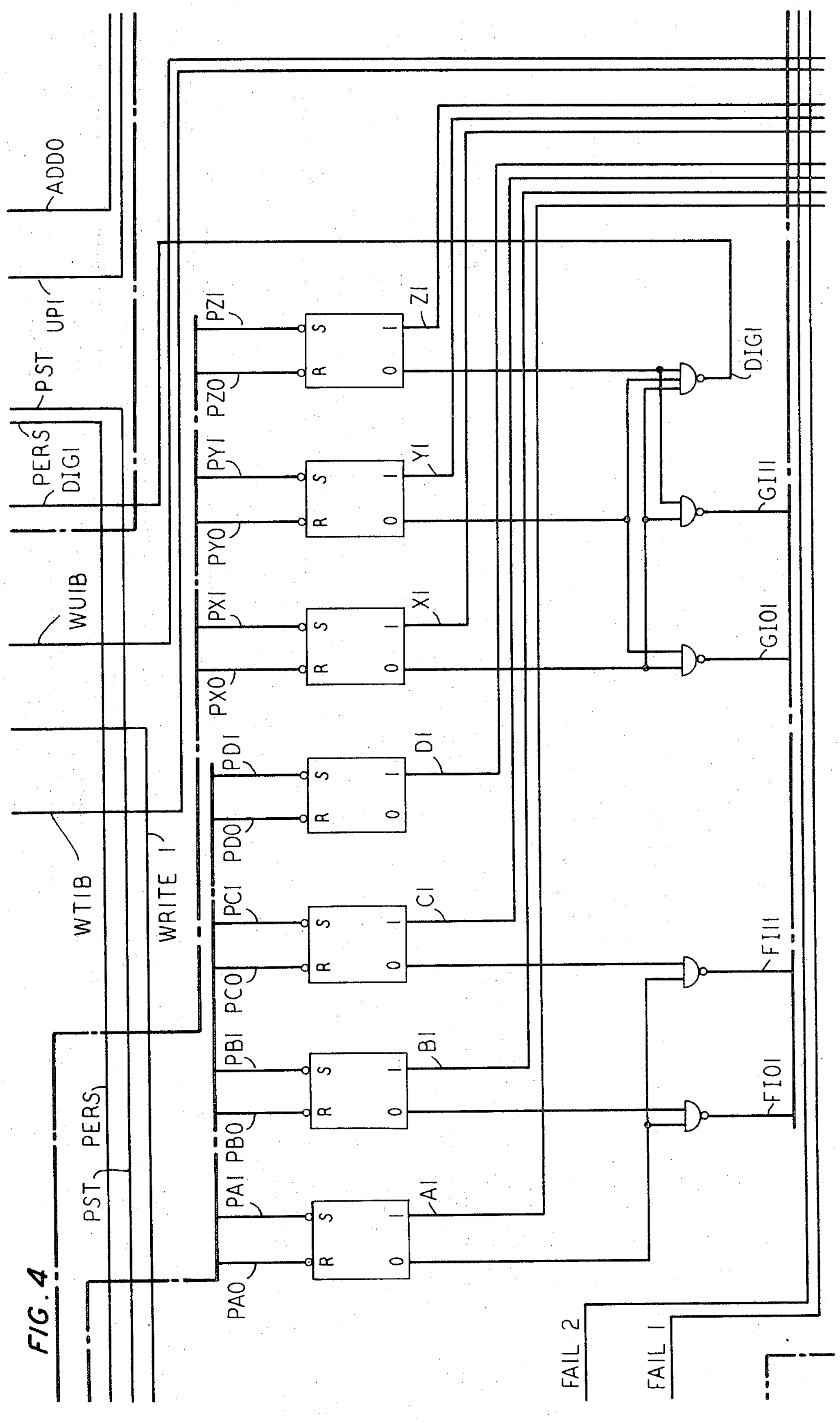

The sequence of operations of the system of the illustrative embodiment is performed in accordance with the outputs of clock 104 (FIG. 3). This clock supplies eight phases to the system. These phases are designated T1, T2, T3, T4, T5, T6, T7 and T8, and pulses appear on the correspondingly designated leads in sequence. Clock 104 comprises a pulse generator along with appropriate logic to divide the output pulses from this generator into eight phases.

Figure 5:
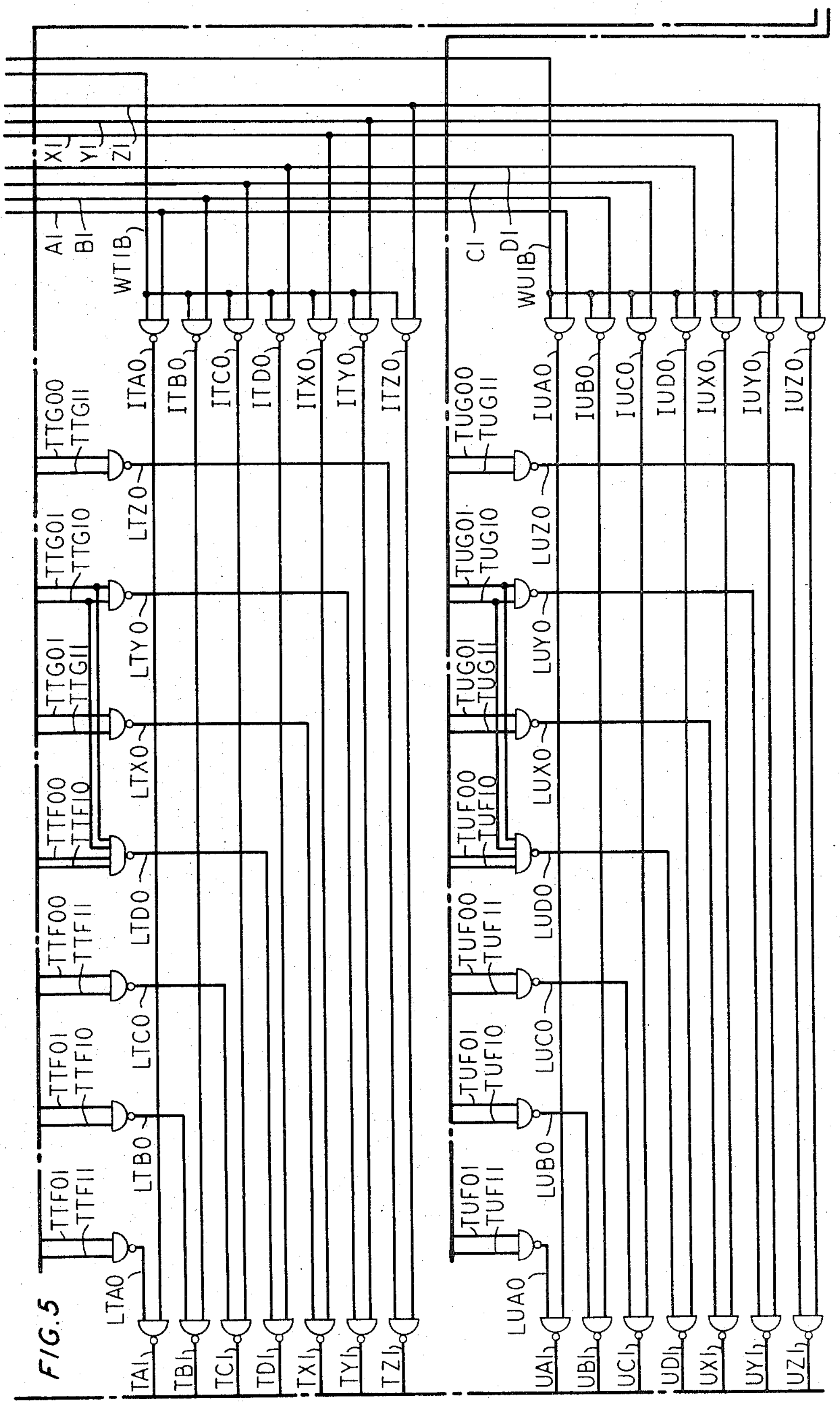

The digit readout lamps at the console may be of any desired type. For illustrative purposes, these lamps are assumed to be of the rear projection type whereby one-out-of-ten lamps are selected from a two-out-of-seven input to display each digit. The input to these lamps from FIG. 5 is in a two-out-of-seven code. Two digit readout lamps are provided; one for the UNITS digit and one for the TENS digit.

CALLED NUMBER ENTRY

Figure 2:
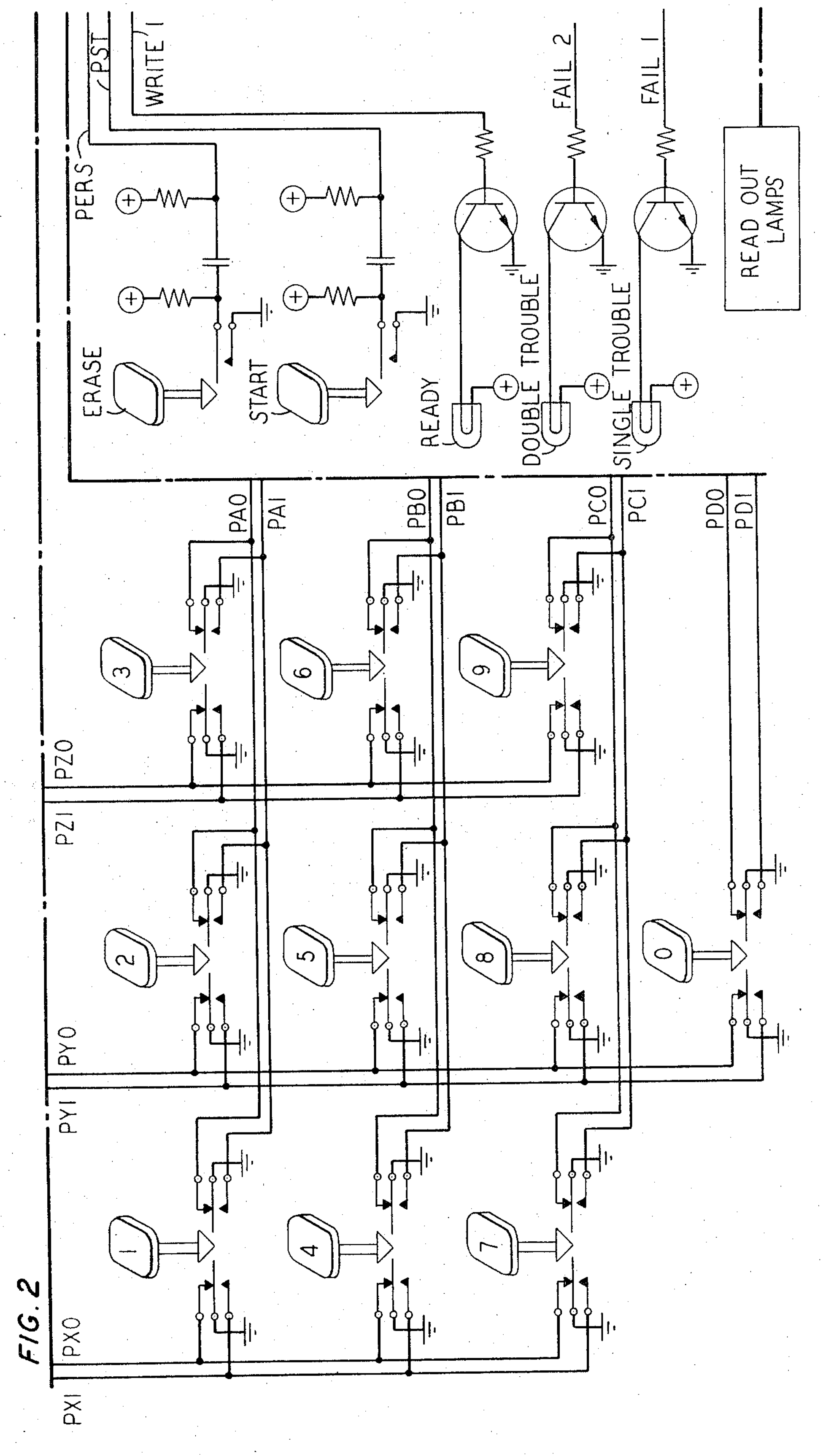
FIGS. 2 through 12, when arranged as shown in FIG. 13, show a more detailed logical schematic diagram of the system of FIG. 1.

When the attendant at the console desires to enter a called station number into the system for the delivery of a message, the first step is the depression of the START key (FIG. 2). This causes a ground pulse to be transmitted over lead PST, which sets flip-flop IS23 (FIG. 3). If the memory of FIGS. 11 and 12 has an empty slot, lead EN31 is low (FIG. 7). The complement of lead EN31 is lead EN30 and this lead would then be high. Lead EN30 is an input to gate IS5 (FIG. 3), as is lead PST1 which is high because flip-flop IS23 has been set. Lead DWN0 is also an input to gate IS5 and is high when the memory pointer comprised of flip-flops MP1 and MP2 (FIG. 7) is not being decremented. Flip-flops IS1 and IS2 comprise the write state indicator and if the sequence control circuit is in its idle write state 0, lead 01, the fourth input to gate IS5, is high. Therefore, during clock phase T1, lead T1 will be pulsed high and the output of gate IS5 will be pulsed low, thereby putting a positive pulse at the T input of flip-flop IS1. Since the J and K inputs of flip-flop IS1 are connected to battery, this positive pulse on the T input will toggle flip-flop IS1 and put the sequence control circuit into write state 1, resulting in lead 11 going high.

In clock 104, leads A0 and B0 are high during phases T1 and T2. With A0 and B0 high and the system being in write state 1, the combination of leads A0, B0 and 11 being high will cause the output of gate IS20 (FIG. 3) to go low. This output is inverted by gate IS21, whose output lead UP1 goes high. On clock pulse T2, lead ADD0 therefore goes low. The combination of a high signal on lead UP1 and a low pulse on lead ADD0 will increment the memory pointer (FIG. 7) to indicate the rightmost vacant memory slot. With lead 11 high, a positive pulse on clock lead T4 will cause lead RESET 1 (FIG. 3) to go high. The high signal on lead RESET 1 is steered by the proper word enable lead, EN11, EN21 or EN31, to clear the rightmost vacant memory slot. Also, with lead 11 high, clock pulse T4 toggles flip-flop IS2, putting the sequence control circuit into write state 3, as indicated by lead 31 going high. It should be noted at this point that the write state indicator, comprised of flip-flops IS1 and IS2, changes state in accordance with a Gray code in the order 0, 1, 3, 2 so that only one of the two flip-flops is toggled between state changes. When lead 31 is high, lead WRITE 1 is also high, thereby lighting the READY lamp at the console. The attendant is thus notified that the system is ready to accept a called number.

With lead 31 high, leads WT1A and WT1B are also high. Lead WT1A is utilized to steer an input digit into the TENS digit portion of the memory (FIG. 11) and lead WT1B is utilized to steer an input digit into the TENS digit lamp readout display. When the attendant now depresses a digit key, the circuitry of FIG. 4 encodes the digit into both the two-out-of-seven code and the binary code defined in the table of FIG. 15. The two-out-of-seven coded signals are steered by lead WT1B into the TENS digit display portion of the readout lamps where this digit is displayed for the duration of the digit key operation. Lead WT1A, in conjunction with lead EN11, EN21, or EN31, steers the binary-coded signals into the rightmost vacant slot in the TENS portion of the memory (FIG. 11). This depression of a digit key also causes lead DIG1 (FIG. 4) to go high, which, in combination with lead 31 being high, toggles flip-flop IS1 and puts the sequence control circuit into write state 2. Lead 21 thereupon goes high and causes leads WU1A and WU1B to go high. WU1A is utilized to steer the next digit input into the UNITS portion of the memory (FIG. 12) and lead WU1B is utilized to steer the next digit into the UNITS digit display portion of the readout lamps. The next time that a digit key at the console is depressed, the digit corresponding to that key is stored in the UNITS portion of the memory (FIG. 12) and is displayed on the UNITS digit display portion of the readout lamps at the console in a similar fashion as was described for the TENS digit. Lead DIG1 is also forced high by this second digit key depression and, with lead 21 high, resets flip-flop IS23 and toggles flip-flop IS2, returning the sequence control circuit to write state 0. Lead 01 is then high. Since both leads 21 and 31 are low, lead WRITE 1 is low and the READY lamp is extinguished. The writing cycle is now complete. At this point, a two-digit called number has been stored in the memory in the rightmost available slot and has been displayed to the attendant. The system is now ready to set up a call and deliver a message.

ERASURE OF LAST INPUT

Depression of the ERASE key at the console by the attendant causes the system to restore itself to the state it was in before the last input. The system goes through a sequence which clears the memory slot to which the memory pointer is pointing and decrements the memory pointer. The write state indicator is also restored to write state 0 so that the system can accept another input.

When the attendant desires to erase the last entry, the ERASE key at the console (FIG. 2) is depressed. This causes a ground pulse to be transmitted over lead PERS to set flip-flop IS25 (FIG. 3). This causes lead ERS1 to go high. If the memory pointer is not being decremented, lead DWN0 is high. Therefore, at clock pulse T4, lead RESET 1 is pulsed. As previously described, this clears the memory slot indicated by the present value of the memory pointer.

The same conditions which caused lead RESET 1 to be pulsed also cause flip-flop IS28 (FIG. 3) to be set, making lead DEC1 high and enabling gate IS30. On clock pulse T5, the output of gate IS30, lead DEC0, is pulsed low. A low pulse on lead DEC0 puts a high pulse at the output of gate MP5 (FIG. 7), which causes the memory pointer to be decremented. The pulse on lead DEC0 also resets flip-flops IS25 and IS23 and clears flip-flops IS1 and IS2, placing the write state indicator in state 0. At clock pulse T6, a pulse on lead $\overline{T6}$ resets flip-flop IS28. This completes the erase sequence.

CALL SEQUENCE

Figure 10:
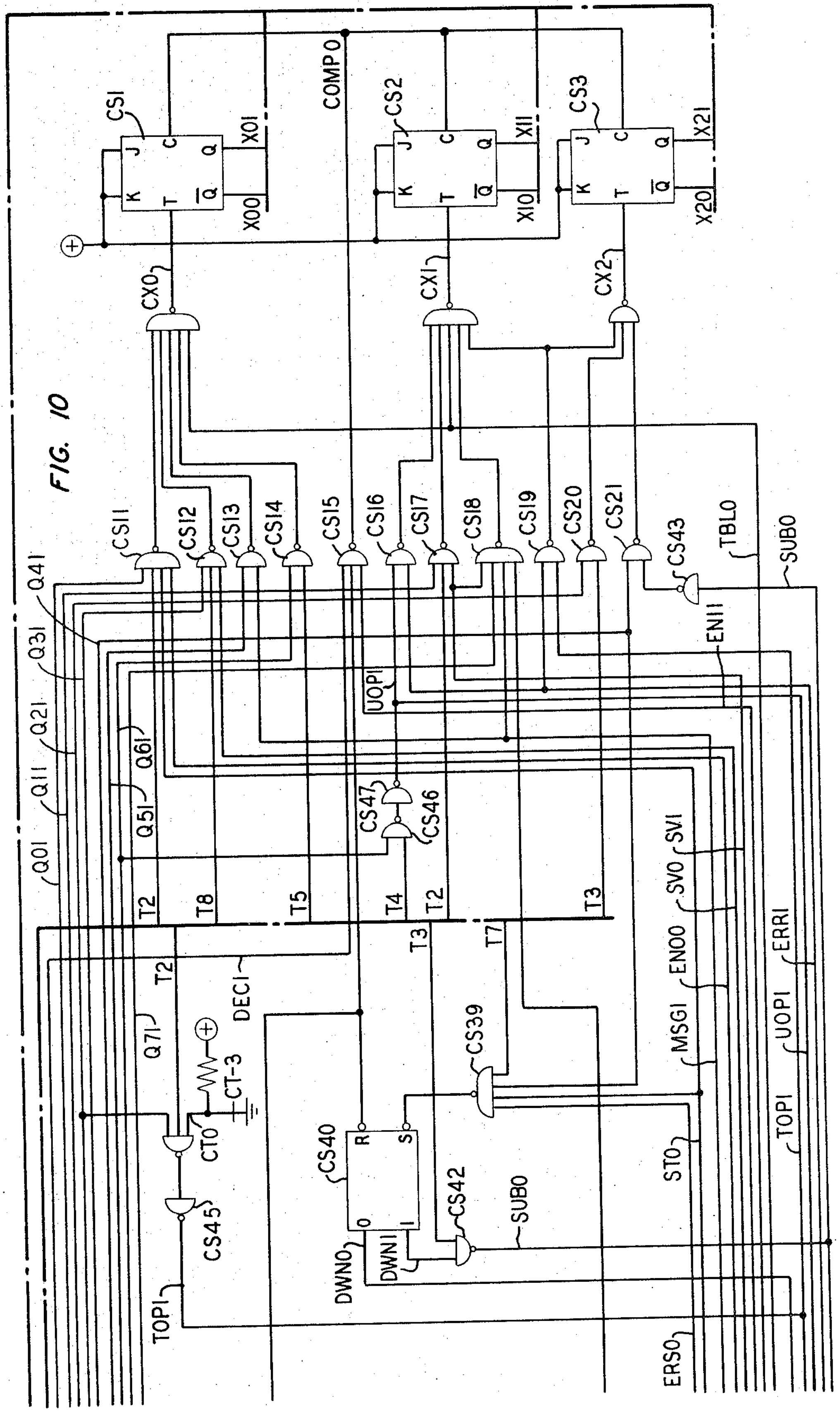

Assuming that the attendant does not operate the ERASE key, after a two-digit number is stored in the memory, the system starts a call sequencing procedure. This procedure is governed by flip-flops CS1, CS2 and CS3 (FIG. 10). These flip-flops constitute the call sequencer and are arranged as a Gray code counter counting in the sequence 0, 1, 3, 2, 6, 7, 5, 4, so that only one of the three flip-flops is toggled between any change of state.

Figure 6:
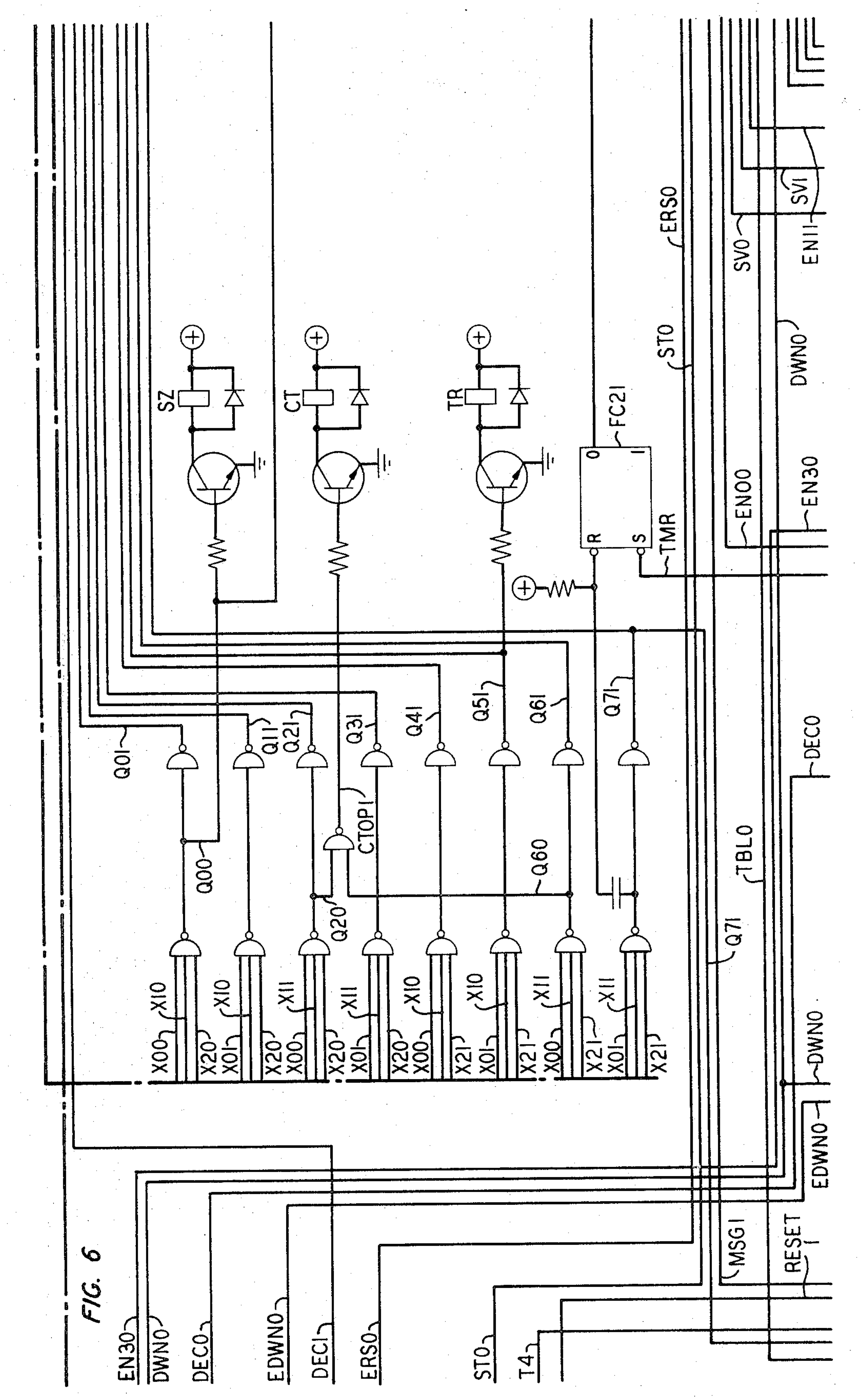

When lead EN00 (FIG. 7) is high, this indicates that the memory has at least one slot filled. Lead Q01 (FIG. 6) being high indicates that the call sequencer is in its idle state. Output lead ST0 of flip-flop IS23 (FIG. 3) is high when the write sequencer is inactive. If all leads EN00, Q01 and ST0 are high, on clock pulse T2 the output of gate CS11 (FIG. 10) goes low. This causes lead CX0 to be pulsed high, toggling flip-flop CS1. Since the call sequencer is originally in state 0, this toggling of flip-flop CS1 puts the sequencer in state 1. Lead Q11 (FIG. 6) therefore goes high as does lead Q00. Lead Q00 going high causes relay SZ to be operated (FIG. 6). The closure of contact SZ–1 in trunk interface 111 (FIG. 9) attempts to seize the trunk of the PBX through the series resistor diode combination.

Figure 9:
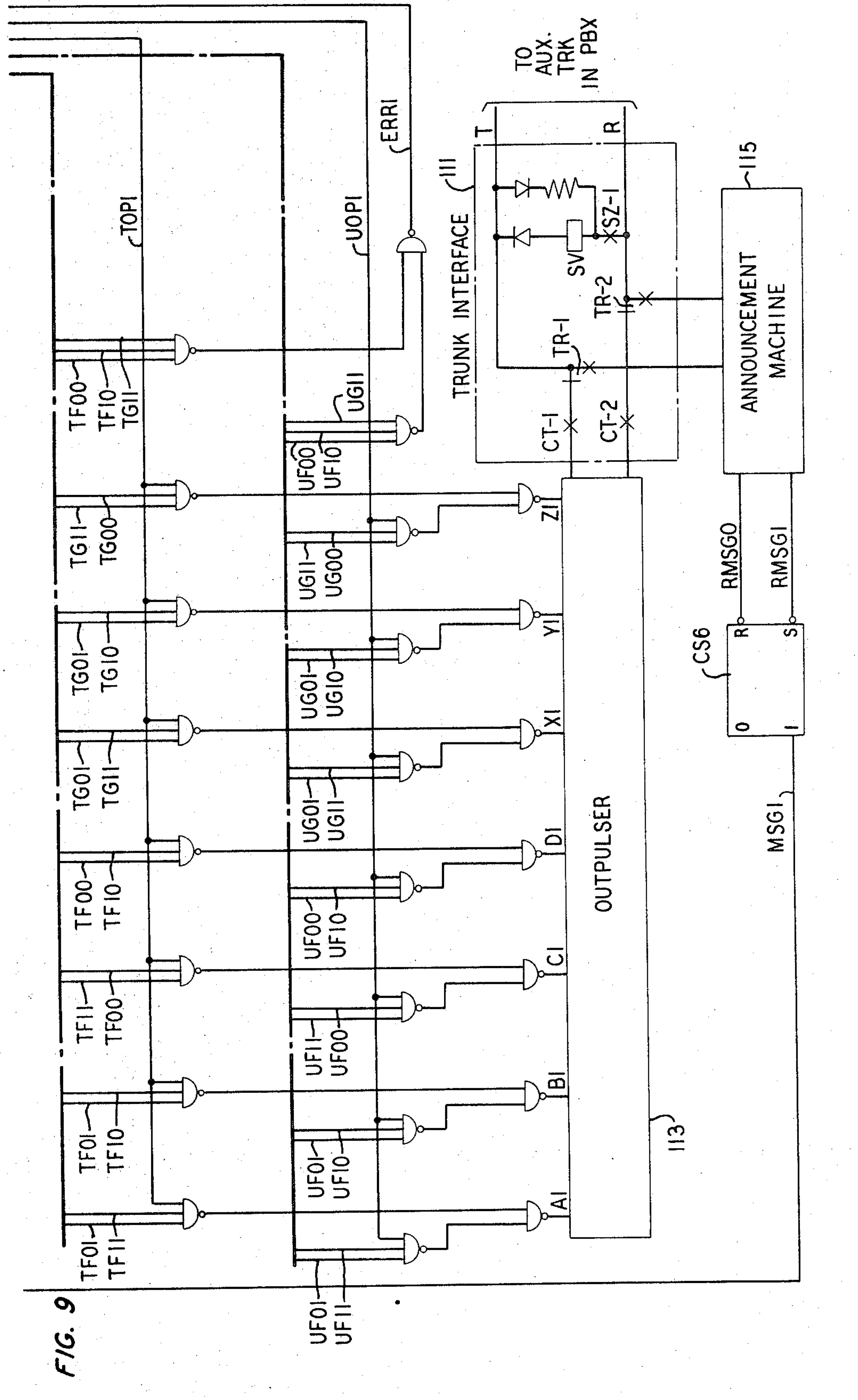

For the purpose of this illustrative embodiment, it is assumed that the PBX to which the illustrative arrangement is connected utilizes reverse-battery trunk signaling. It is also assumed that lead T of the trunk is initially positive with respect to lead R of the trunk. Therefore, when the PBX connects a register to the trunk to receive dial pulses, it reverses polarity on the T and R leads, which causes the operation of relay SV in trunk interface 111 (FIG. 9). When relay SV is operated, flip-flop CS4 (FIG. 7) is set, putting a high signal on lead SV1. On the following T2 clock pulse, the high signal on leads SV1 and Q11 causes a low signal at the output of gate CS17 (FIG. 10), which in turn causes a high pulse on lead CX1. This pulse on lead CX1 toggles flip-flop CS2 and puts the call sequencer into state 3. Lead Q31 (FIG. 6) then goes high. When the PBX indicates a readiness of the register connected to the trunk to receive digits, it reverses the polarity of leads T and R. This de-energizes relay SV in trunk interface 111, resetting flip-flop CS4 (FIG. 7) and putting a high signal on lead SV0. The combination of a high signal on lead Q31 and a high signal on lead SV0 enables gate CS12 (FIG. 10) so that when clock pulse T8 appears, lead CX0 is pulsed. The pulsing of CX0 toggles flip-flop CS1, putting the call sequencer into state 2 and placing a high signal on lead Q21 (FIG. 6). This is the state during which the TENS digit in memory slot 1 is outpulsed to the PBX.

When lead Q21 is high, lead Q20 is low, thereby making lead CT0P1 go high. Lead CT0P1 being high operates relay CT (FIG. 6). The operation of relay CT closes contacts CT–1 and CT–2 in trunk interface 111, connecting outpulser 113 to the PBX trunk (FIG. 9). The operation of relay CT also opens contact CT–3 (FIG. 10), putting a high signal on lead CT0. Since lead CT0 and lead Q21 are high, the next T2 clock pulse causes lead T0P1 to be pulsed high. This high pulse on lead T0P1 gates the contents of the TENS digit stored in memory slot 1 (FIG. 11) into outpulser 113 (FIG. 9) which converts the binary-coded digit into a multifrequency code and pulses this digit into the register of the PBX.

On the next T3 clock pulse, gate CS20 (FIG. 10) is pulsed, thereby pulsing lead CX2 which toggles flip-flop CS3. This puts the call sequencer into state 6, putting a high signal on lead Q61. With lead Q61 high, the next T4 clock pulse pulses lead U0P1. The pulse on lead U0P1 gates the UNITS digit in memory slot 1 (FIG. 12) into outpulser 113 (FIG. 9), which pulses this digit to the PBX. The PBX can now set up a connection to the called station in its usual manner.

On clock pulse T5, gate CS14 (FIG. 10) is pulsed, pulsing lead CX0 and toggling flip-flop CS1. The call sequencer is now in state 7. Relay CT is de-energized because both leads Q20 and Q60 are high.

At this time the system is awaiting an answer from the called station and starts timing an interval during which the called party should answer. When lead Q71 goes high, a 1-minute timer (FIG. 8) is started. Assuming that the called party answers, reverse battery on leads T and R operates relay SV, putting a high signal on lead SV1 (FIG. 7). The high signal on lead SV1 partially enables gate CS18 (FIG. 10), whose other inputs are lead Q71, which is high, the "0" output of flip-flop FC21, which is normally high, and lead MSG1, which is normally low. A pulse over lead MSG1 indicates that announcement machine 115 (FIG. 9) is ready to deliver a message. For the purpose of this illustrative embodiment, announcement machine 115 may be considered to contain a continuous loop of recording tape with a light-conducting strip at the portion of the loop corresponding to the beginning of the message recorded on the tape. A photo-sensor is provided which normally puts a low signal on lead RMSG0 and a high signal on lead RMSG1 except when it responds to the light-conducting strip. At this time, the signals on leads RMSG0 and RMSG1 are reversed for a short duration. Therefore, lead MSG1 (FIG. 9) is pulsed high at the end of a message.

Returning now to the call sequencer, a high pulse on lead MSG1 pulses gate CS18, thereby pulsing lead CX1. This toggles flip-flop CS2 and puts the call sequencer into state 5. In state 5, lead Q51 is high, energizing relay TR (FIG. 6). The energization of relay TR operates transfer contacts TR–1 and TR–2 in trunk interface 111 (FIG. 9), connecting announcement machine 115 over leads T and R to the PBX and through the PBX over the established connection to the called party. At the conclusion of the message, lead MSG1 is again pulsed. This pulses gate CS13 (FIG. 10) which in turn pulses lead CS0, toggling flip-flop CS1 and putting the call sequencer into state 4. In state 4, lead Q51 goes low, de-energizing relay TR.

If the attendant is neither entering a called number into the system nor erasing an entry, leads ST0 and ERS0 (FIG. 3) are both high. In state 4, lead Q41 is high. These leads are all inputs to gate CS39 (FIG. 10). Therefore, on clock pulse T7, gate CS39 is pulsed, setting flip-flop CS40 (FIG. 10). When flip-flop CS40 is set, lead DWN1 is high. Therefore, on clock pulse T3, gate CS42 (FIG. 10) is pulsed, putting a low pulse on lead SUB0. A low pulse on lead SUB0 pulses the output of gate MP5 (FIG. 7) high, thereby allowing the memory pointer (FIG. 7) to be decremented in accordance with the inputs to gates MP6, MP7, MP8 and MP9. The pulse on lead SUB0 is also used as the T input to the T lead of the shift registers in the memory (FIGS. 11 and 12), which causes the contents of the memory to be shifted one slot to the right. The pulse on lead SUB0, in combination with lead Q41 being high, also pulses gate CS21 (FIG. 10), thereby putting a pulse on lead CX2. The pulse on lead CX2 toggles flip-flop CS3, putting the call sequencer in state 0, its idle state. In state 0, lead Q00 goes low, de-energizing relay SZ (FIG. 6). The de-energization of relay SZ releases the trunk (FIG. 9). The low signal on lead Q00 also resets flip-flop CS40 (FIG. 10), completing the clearing of the call sequencer.

INVALID CHARACTER

In the event that there is an error in the form of an invalidly coded digit in the memory, during the outpulsing of this digit lead ERR1 (FIG. 9) will be made high. This lead is an input to gates CS16 and CS19 (FIG. 10). The other input to gate CS16 is lead U0P1 which is high when the UNITS digit is being outpulsed. The other input to gate CS19 is lead T0P1 which is high when the TENS digit is being outpulsed. In the event that the TENS digit was being outpulsed, the call sequencer was in state 2. When gate CS19 is pulsed, this pulses leads CX1 and CX2, toggling flip-flops CS2 and CS3 and putting the call sequencer into state 4. If the UNITS digit was being outpulsed, the call sequencer was in state 6. Therefore, when gate CS16 is pulsed, this pulses lead CX1, toggling flip-flop CS2 and putting the call sequencer into state 4. When the call sequencer is in state 4, this causes the call sequencer to clear itself, as described above with respect to the normal call sequence operation.

If the call sequencer is not in its idle state, as indicated by lead Q00 being high, and the last entry is being erased, as indicated by leads EN11 and DEC1 being high, gate CS15 (FIG. 10) is enabled and lead C0MP0 is pulsed low. Lead C0MP0 is connected to the clear input of flip-flops CS1, CS2 and CS3 which comprise the call sequencer. The pulse on lead C0MP0 resets all these flip-flops and restores the call sequencer to an idle state.

TROUBLE SEQUENCE

Two possible conditions are defined as a trouble. These conditions are either that the called party does not answer or that the called line is busy. In either event, the effect is the same on the illustrative system. The reader will recall that after the called number was outpulsed to the PBX the call sequencer was put into state 7 and the 1-minute timer (FIG. 8) was started. The call sequencer remains in state 7 until answer supervision is returned over the trunk from the PBX. Therefore, if the called party does not answer within one minute or the line is busy, the call sequencer remains in state 7 and lead TMR (FIG. 8) will go low. Lead TMR going low causes flip-flop FC21 (FIG. 6) to be set. (From the drawing, it will be noted that flip-flop FC21 is reset whenever the call sequencer enters state 7.) The "0" output of flip-flop FC21 going low disables gate CS18 (FIG. 10), thereby preventing the pulses on lead MSG1 from changing the call sequencer state and subsequently connecting announcement machine 115 to the trunk.

Figure 8:
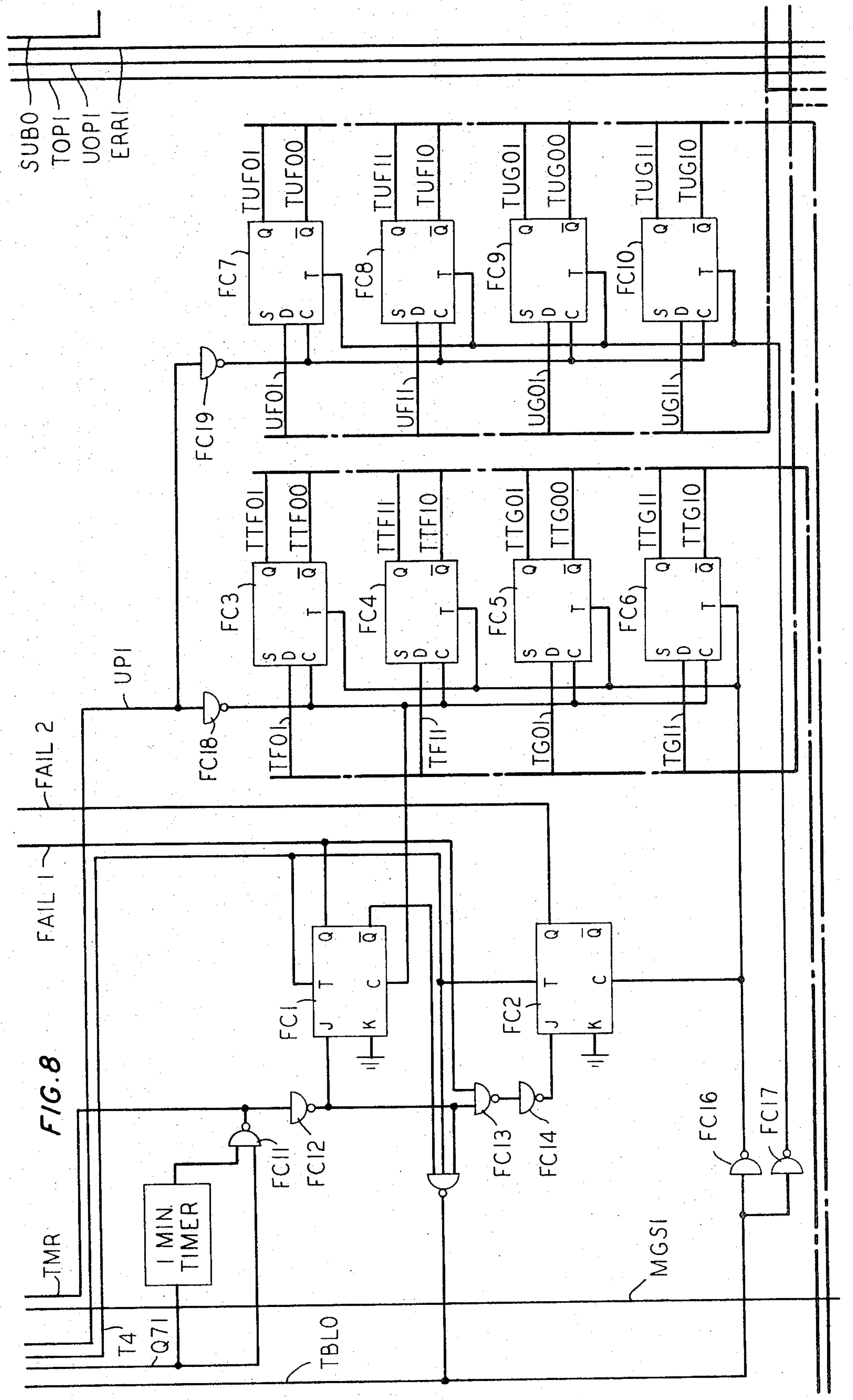

When lead TMR goes low, indicating that the call sequencer was in state 7 for 1 minute, this low signal is inverted by gate FC12 (FIG. 8), and on clock pulse T4 flip-flop FC1 is set. This same clock pulse causes lead TBL0 to go low. The signal on lead TBL0 is inverted by gates FC16 and FC17 to cause the contents of memory slot 1 (FIGS. 11 and 12) to be gated into the trouble register made up of flip-flops FC3 through FC10 (FIG. 8). This memory slot contains the number of the called station which did not answer within 1 minute. The contents of the trouble register are transmitted through the translator circuit of FIG. 5 and displayed on the readout lamps at the console.

When flip-flop FC1 (FIG. 8) is set, lead FAIL1 is high. This lead being high causes the SINGLE TROUBLE lamp at the console to be lit. Since the trouble arises when the call sequencer is in state 7, the TBL0 lead is used to pulse leads CX0 and CX1 (FIG. 10), which toggle flip-flops CS1 and CS2. This puts the call sequencer into state 4, which then brings the call to a normal termination and allows the call sequencer to set up a call to the called station whose number was stored in memory slot 2.

If a second trouble is encountered while flip-flop FC1 is set, lead FAIL1 causes the signal on lead TMR to be gated through gates FC13 and FC14, thereby setting flip-flop FC2 on clock pulse T4 (FIG. 8). The output of flip-flop FC2 is lead FAIL2 which lights the DOUBLE TROUBLE lamp at the console. Flip-flop FC1 being set at this time inhibits the pulse on lead TBL0 which also inhibits the gating of the number from memory slot 1 into the trouble register. The lack of a pulse on lead TBL0 prevents the call sequencer from changing state until there is manual intervention by the attendant.

When the attendant realizes that there has been a trouble of some sort, the START key at the console must be depressed. As previously described, if the attendant depresses the START key there is a pulse on lead UP1 (FIG. 3). This pulse resets flip-flop FC1 (FIG. 8) and all of the flip-flops comprising the trouble register. If the system were in a double trouble state and flip-flop FC2 were set, the next T4 clock pulse would cause flip-flop FC1 to be set and would also cause a pulse on lead TBL0. The pulse on lead TBL0 clears flip-flop FC2 and gates the number in memory slot 1 (FIGS. 11 and 12) to the trouble register (FIG. 8). The DOUBLE TROUBLE lamp at the console is extinguished and the SINGLE TROUBLE lamp is lit. The call sequencer could then proceed to set up another call while the attendant could take note of this second trouble.

Accordingly, an arrangement has been shown for connection as an applique to a PBX which allows a PBX attendant to originate a series of message delivery calls. While the PBX is establishing a connection to a called station and while a message is being delivered to a called station, the attendant can enter further called numbers into the applique. The attendant is notified by the applique when there is a failure to complete a call because a called party does not answer.

What is claimed is:

1. In a telephone branch switching system having an attendant station, an arrangement for establishing call connections to a plurality of called stations comprising a memory, means responsive to the receipt of station number signals from said attendant station for sequentially registering representations of said signals in said memory for a plurality of called stations, control means responsive to the registering of said representations of said signals for automatically establishing call connections to each of said plurality of called stations in the order in which said signals were received from said attendant station, timing means responsive to the establishment of a connection to one of said called stations by said control means for timing a predetermined interval and generating an output signal upon the expiration of said predetermined interval, indicating means activated in response to said output signal for supplying said attendant station with the station number of said one called station and an indication of failure to complete a call to said one called station, and means responsive to an answer signal from said one called station for inhibiting the activation of said indicating means.

2. The arrangement of claim 1 further comprising announcement means supplying a recorded message, and means responsive to an answer signal from one of said called stations for connecting said announcement means to said one called station over an established connection.

3. The arrangement of claim 2 further comprising means responsive to the end of said recorded message for causing said control means to establish a call connection to another one of said called stations.

4. The arrangement of claim 1 further comprising means responsive to said output signal for causing said control means to establish a call connection to another one of said called stations.

5. An arrangement connected to a telephone branch switching system for providing message delivery service to stations of said switching system comprising a memory, input means activated in response to a predetermined signal from a system attendant station for receiving signals identifying stations of said switching system from said attendant station and for registering representations of said received signals in said memory, control means activated in response to the registration of a station signal representation in said memory for transmitting an identification of said station from said memory to said switching system to enable said system to establish a connection to a station identified by said transmitted identification, announcement means supplying a recorded message, means responsive to an answer signal over said established connection for connecting said announcement means over said established connection to said identified station and for removing said station signal representation from said memory, timing means responsive to the transmission of said station identification to said switching system for timing a predetermined interval including means generating an output signal upon the expiration of said predetermined interval, first indicating means activated in response to said output signal for supplying said attendant station with said station identifying signal and an indication of a failure to complete a call to said identified station including means for removing said station signal representation from said memory, and means responsive to an answer signal over said established connection for inhibiting the activation of said indicating means.

6. The arrangement of claim 5 wherein said announcement means includes means generating a message signal at the termination of said recorded message, said arrangement further comprising means responsive to said message signal for activating said control means to transmit the identification of another station from said memory to said switching system.

7. The arrangement of claim 5 further comprising means responsive to said output signal for activating said control means to transmit the identification of another station from said memory to said switching system.

8. The arrangement of claim 7 further comprising means responsive to said predetermined signal from said attendant station for deactivating said first indicating means.

9. The arrangement of claim 8 further comprising second indicating means activated in response to said output signal while said first indicating means is activated for supplying said attendant station with an indication of a failure to complete a call to said another station.

10. The arrangement of claim 9 further comprising means responsive to said predetermined signal from said attendant station while said second indicating means is activated for deactivating both said first and said second indicating means and for then reactivating said first indicating means to supply said attendant station with said another station identifying signal.

11. An arrangement connected to a telephone branch switching system for providing message delivery service to stations of said switching system comprising a memory, input means activated in response to a predetermined signal from a system attendant station for receiving signals identifying stations of said switching system from said attendant station and for registering representations of said received signal in said memory, control means activated in response to the registration of a station signal representation in said memory for transmitting an identification of said station from said memory to said switching system to enable said system to establish a connection to a station identified by said transmitted identification, announcement means supplying a recorded message, means responsive to an answer signal over said established connection for connecting said announcement means over said established connection to said identified station and for removing said station signal representation from said memory, and means responsive to a different predetermined signal from said attendant station for removing from said memory the most recently received station signal representation.

12. In a telephone switching system having an attendant station, an arrangement for automatically establishing call connections in sequence to a plurality of called stations comprising a memory, temporary register means for storing identification of a station to be called, means responsive to the receipt of a signal from said attendant station for storing said identification in said temporary register means, means for outpulsing station calling numbers to establish call connections within the switching system, and control means, said control means including a call sequencer for determining the operations of the control means, means under control of said call sequencer for transferring from said temporary register means to said memory identifications of the stations to be called and for storing said identifications in sequence in said memory means, means under control of said call sequencer for causing said outpulser means to outpulse in accordance with stored identifications from said memory, whereby the attendant may rapidly and successively store identifications of stations to be called in said temporary register means while the arrangement is establishing a connection to a station, trouble register means, means responsive to failure of call completion for transferring the identification of the called station from said memory to said trouble register means, means for displaying to the attendant the identity of the station whose identification is stored in said trouble register means, and means for causing said call sequencer to assume a state for reading out the next sequential station identification in said memory.

13. In a telephone switching system having an attendant station, an arrangement for automatically establishing call connections in sequence to a plurality of called stations comprising a memory, temporary register means for storing identification of a station to be called, means responsive to the receipt of a signal from said attendant station for storing said identification in said temporary register means, means for outpulsing station calling numbers to establish call connections within the switching system, and control means, said control means including a call sequencer for determining the operations of the control means, means under control of said call sequencer for transferring from said temporary register means to said memory identifications of the stations to be called and for storing said identifications in sequence in said memory means, and means under control of said call sequencer for causing said outpulser means to outpulse said stored identifications from said memory, whereby the attendant may rapidly and successively store identifications of stations to be called in said temporary register means while the arrangement is establishing a connection to a station, said memory comprising a plurality of flip-flop shift registers arranged in an array and means for automatically transferring stored identifications towards the shift register positions at one end of said array.

14. An arrangement in accordance with claim 13 wherein said means for transferring from said temporary register means to said memory includes means for entering the called station identification in the vacant shift register position closest to said one end of said array.

15. An applique system for a telephone branch switching system for allowing an attendant to originate rapidly a series of message delivery calls without waiting for completion of the calls by the telephone branch switching system, the applique system comprising a memory including a plurality of shift register elements arranged in at least one array, means responsive to the receipt of station number signals from the attendant for sequentially registering representations of said signals in certain of said shift register elements for a plurality of called stations, means responsive to the registering of said representations of said signals for automatically reading out from said memory said representations to allow the establishment of call connections by the telephone branch switching system to each of said plurality of called stations in the order in which said signals were received from the attendant, and sequence control means for controlling said registering means and said readout means whereby said representations are sequentially registered in said memory for one called station as the representations for a prior called station are being read from said memory.

16. An applique system in accordance with claim 15 further comprising up/down counter means for controlling said registering means to store a new representation in the vacant shift register elements closest to the one end of said shift register array at which said representations are read out.

* * * * *